(12) United States Patent
Nagata et al.

(10) Patent No.: US 12,525,130 B2
(45) Date of Patent: Jan. 13, 2026

(54) DISPATCH SERVICE TO SUPPLY ENERGY SOURCE TO PARKED USER VEHICLE AT SPECIFIED LOCATION

(71) Applicant: TOYOTA JIDOSHA KABUSHIKI KAISHA, Toyota (JP)

(72) Inventors: Yu Nagata, Chofu (JP); Shun Hashimoto, Kiyosu (JP); Kota Yamazaki, Kasugai (JP); Akane Masaki, Nisshin (JP); Wataru Eto, Nagoya (JP); Makoto Akahane, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 128 days.

(21) Appl. No.: 18/430,008

(22) Filed: Feb. 1, 2024

(65) Prior Publication Data

US 2024/0265812 A1  Aug. 8, 2024

(30) Foreign Application Priority Data

Feb. 3, 2023  (JP) ................................. 2023-015649

(51) Int. Cl.
  *G08G 1/00* (2006.01)
  *B60L 53/00* (2019.01)
  *B60L 53/80* (2019.01)

(52) U.S. Cl.
  CPC .............. *G08G 1/202* (2013.01); *B60L 53/00* (2019.02); *B60L 53/80* (2019.02)

(58) Field of Classification Search
  CPC .......... G08G 1/202; B60L 53/00; B60L 53/80
  See application file for complete search history.

(56) References Cited

U.S. PATENT DOCUMENTS

| 11,584,237 B2* | 2/2023 | Li ........................... B60L 53/68 |
| 11,915,587 B2* | 2/2024 | Rosas-Maxemin .......................... G08G 1/096888 |
| 2022/0308647 A1* | 9/2022 | Nishizaka ............... G06Q 10/02 |

FOREIGN PATENT DOCUMENTS

| CN | 106157625 A | 11/2016 |
| JP | 2019-089476 A | 6/2019 |
| JP | 2020107303 A * | 7/2020 |

* cited by examiner

*Primary Examiner* — Curtis A Kuntz
*Assistant Examiner* — James E Munion
(74) *Attorney, Agent, or Firm* — Finnegan, Henderson, Farabow, Garrett and Dunner LLP

(57) ABSTRACT

A terminal program, which is configured to request a service to dispatch a service staff or a service vehicle to a location in which a user vehicle is parked and supply an energy source to the user vehicle, is configured to cause a computer to execute operations that include receiving, from a server apparatus, location data indicating locations in which respective user vehicles have been parked when the service has been used by multiple users, and displaying the received location data on a display.

18 Claims, 10 Drawing Sheets

FIG. 3

| LOCATION 51 | COORDINATES 52 | USER 53 | HAS SERVICE BEEN AVAILABLE? 54 | DATE/TIME 55 | ENVIRONMENTAL CONDITION 56 | USER EVALUATION 57 | |
|---|---|---|---|---|---|---|---|
| P2 | ... | U2 | YES | ... | SUNNY | ... | ... |
| P3 | ... | U3 | YES | ... | SUNNY | ... | ... |
| P4 | ... | U4 | YES | ... | SUNNY | ... | ... |
| P5 | ... | U5 | NO | ... | RAINY | ... | ... |
| ... | ... | ... | ... | ... | ... | ... | ... |

DISPATCH SERVICE TO SUPPLY ENERGY SOURCE TO PARKED USER VEHICLE AT SPECIFIED LOCATION

CROSS-REFERENCE TO RELATED APPLICATION

This application claims priority to Japanese Patent Application No. 2023-015649 filed on Feb. 3, 2023, the entire contents of which are incorporated herein by reference.

TECHNICAL FIELD

The present disclosure relates to a terminal program and a server apparatus.

BACKGROUND

Patent Literature (PTL) 1 discloses a system to provide a service to charge vehicles on behalf of users and a service to dispatch power-feeding vehicles.

CITATION LIST

Patent Literature

PTL 1: JP 2020-107303 A
PTL 2: JP 2019-089476 A
PTL 3: CN 106157625 A

SUMMARY

In a service to charge vehicles on behalf of users, parking spaces available for the users to receive the service are limited because agents need to pick up the vehicles to be charged. In some cases, such as when a user has parked a vehicle to be charged in a parking lot where only specific people are allowed to enter, the user may not receive the service even though the user has requested the service.

In a service to dispatch power-feeding vehicles, parking spaces available for users to receive the service are limited because the power-feeding vehicles need to stop in the vicinity of vehicles to be charged. In some cases, such as when a user has parked a vehicle to be charged in a small parking space, the user may not receive the service even though the user has requested the service.

It would be helpful to make it easier for users to know where to park vehicles to receive services to supply energy sources to the vehicles.

A terminal program according to the present disclosure is configured to request a service to dispatch a service staff or a service vehicle to a location in which a user vehicle is parked and supply an energy source to the user vehicle, the terminal program configured to cause a computer to execute operations, the operations including:

receiving, from a server apparatus, location data indicating locations in which respective user vehicles have been parked when the service has been used by multiple users; and displaying the received location data on a display.

A server apparatus according to the present disclosure includes:

a communication interface configured to communicate with a terminal apparatus configured to request a service to dispatch a service staff or a service vehicle to a location in which a user vehicle is parked and supply an energy source to the user vehicle; and a controller configured to:

accumulate location data indicating locations in which respective user vehicles have been parked when the service has been used by multiple users;

transmit the accumulated location data to the terminal apparatus via the communication interface; and upon receiving, from the terminal apparatus via the communication interface, request data requesting the service with indication of a parking location designated using the terminal apparatus, perform a process of dispatching the service staff or the service vehicle to the parking location indicated by the received request data.

According to the present disclosure, it becomes easier for users to know where to park vehicles to receive services to supply energy sources to the vehicles.

BRIEF DESCRIPTION OF THE DRAWINGS

In the accompanying drawings:

FIG. 3 is a table illustrating an example of location data according to the embodiment of the present disclosure;

DETAILED DESCRIPTION

Figure 1:
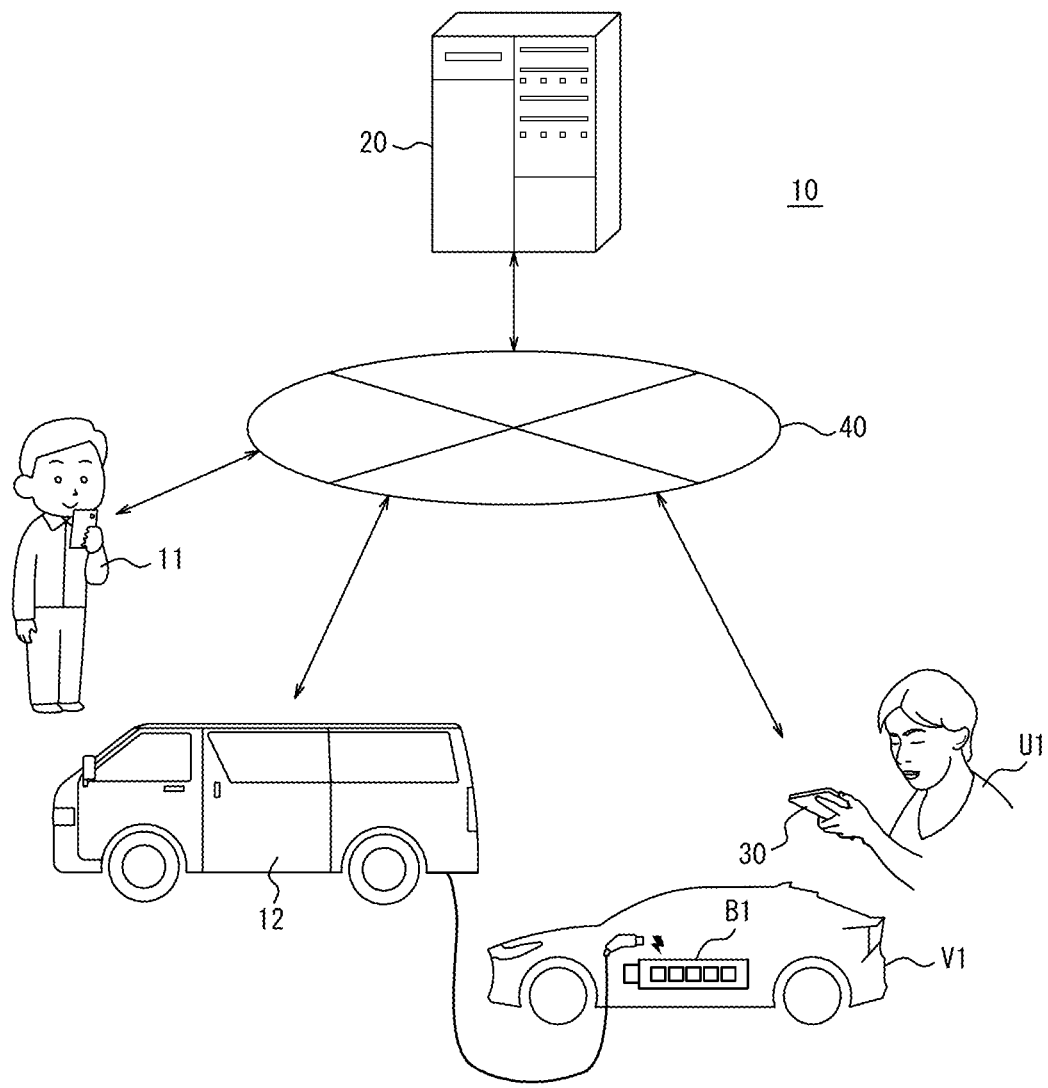
FIG. 1 is a diagram illustrating a configuration of a system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes a server apparatus 20 and a terminal apparatus 30. The server apparatus 20 can communicate with the terminal apparatus 30 via a network 40. The server apparatus 20 may be able to communicate via the network 40 with a mobile device such as a mobile phone, smartphone, or tablet held by a service staff 11. The server apparatus 20 may be able to communicate via the network 40 with an in-vehicle device installed in a service vehicle 12 or a mobile device such as a mobile phone, smartphone, or tablet held by a staff on board the service vehicle 12.

The server apparatus 20 is a computer that belongs to a cloud computing system or other computing system installed in a facility such as a data center. The server apparatus 20 is operated by a supply service provider.

The terminal apparatus 30 is, for example, a mobile device such as a mobile phone, smartphone, or tablet held by each user. The terminal apparatus 30 executes a terminal program to request a supply service.

The supply service is a service to dispatch the service staff 11 or the service vehicle 12 to a location in which a user vehicle is parked and supply an energy source to the user vehicle. In the present embodiment, the user vehicle is a BEV. The term "BEV" is an abbreviation of battery electric vehicle. The energy source to be supplied to the user vehicle is electricity. As a variation of the present embodiment, the user vehicle may be another type of automobile such as a gasoline vehicle, a diesel vehicle, a hydrogen vehicle, an HEV, a PHEV, or an FCEV. The term "HEV" is an abbreviation of hybrid electric vehicle. The term "PHEV" is an abbreviation of plug-in hybrid electric vehicle. The term "FCEV" is an abbreviation of fuel cell electric vehicle. The user vehicle may be a MaaS-dedicated vehicle. The term "MaaS" is an abbreviation of Mobility as a Service. The energy source to be supplied to the user vehicle is not limited to electricity, but may be gasoline, diesel fuel, hydrogen, or the like.

The supply service includes at least a charging service or a battery replacement service, and includes both of the charging service and the battery replacement service in the present embodiment. The charging service is a service to supply the energy source to the user vehicle by charging a battery installed in the user vehicle. The battery replacement service is a service to supply the energy source to the user vehicle by replacing the battery installed in the user vehicle with another battery. As a variation of the present embodiment, the supply service may include a service to refuel the user vehicle.

The supply service includes at least an agent-type service or a mobile-type service, and includes both of the agent-type service and the mobile-type service in the present embodiment. The agent-type service is a service to dispatch the service staff 11 to the location in which the user vehicle is parked, have the dispatched service staff 11 move the user vehicle to another location, and supply the energy source to the user vehicle in the location to which the user vehicle is moved. The mobile-type service is a service to dispatch the service vehicle 12 to the location in which the user vehicle is parked and have the dispatched service vehicle 12 supply the energy source to the user vehicle in the location in which the user vehicle is parked.

In the present embodiment, one of the following combinations of services is selected by each user or automatically, and provided as the supply service: a combination of the charging service and the agent-type service, a combination of the battery replacement service and the agent-type service, a combination of the charging service and the mobile-type service, and a combination of the battery replacement service and the mobile-type service. In other words, in the present embodiment, the agent-type charging service, the agent-type battery replacement service, the mobile-type charging service, or the mobile-type battery replacement service is selectively provided.

For example, in the agent-type charging service, while a user U1 is not using a user vehicle V1, a worker as the service staff 11 drives the user vehicle V1 from a parking lot to a charging station, charges a battery B1 of the user vehicle V1, and then returns the user vehicle V1. In the agent-type battery replacement service, while the user U1 is not using the user vehicle V1, the worker as the service staff 11 drives the user vehicle V1 from the parking lot to a battery replacement station, replaces the battery B1 of the user vehicle V1 with another battery, and then returns the user vehicle V1. In the mobile-type charging service, a mobile charging vehicle as the service vehicle 12 comes to the parking lot, and charges the battery B1 of the user vehicle V1 on the spot. In the mobile-type battery replacement service, a mobile battery replacement vehicle as the service vehicle 12 comes to the parking lot, and replaces the battery B1 of the user vehicle V1 with another battery on the spot.

The network 40 includes the Internet, at least one WAN, at least one MAN, or any combination thereof. The term "WAN" is an abbreviation of wide area network. The term "MAN" is an abbreviation of metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

The server apparatus 20 accumulates location data. The location data is data indicating locations in which respective user vehicles have been parked when the supply service has been used by multiple users. The server apparatus 20 transmits the accumulated location data to the terminal apparatus 30. The terminal apparatus 30 receives the location data from the server apparatus 20. The terminal apparatus 30 displays the received location data on a display. The terminal apparatus 30 transmits request data to the server apparatus 20. The request data is data requesting the supply service with indication of a parking location designated using the terminal apparatus 30. Upon receiving the request data from the terminal apparatus 30, the server apparatus 20 performs a process of dispatching the service staff 11 or the service vehicle 12 to the parking location indicated by the received request data.

According to the present embodiment, it becomes easier for users to know where to park vehicles to receive services to supply energy sources to the vehicles. As a result, the possibility that a user may not receive a service, even though the user has requested the service, can be reduced.

For example, when the user U1 receives the agent-type service, the service staff 11 needs to pick up the user vehicle V1. Therefore, the user U1 should avoid parking the user vehicle V1 in a parking lot that only specific people can enter, such as a parking lot reserved for hotel guests, which can only be entered with a hotel key. According to the present embodiment, the user U1 can know, with reference to the location data displayed on the display, where the other users have parked the respective user vehicles when the other users have used the agent-type service. Thus, it becomes easier for the user U1 to know where to park the user vehicle V1 to receive the agent-type service.

For example, when the user U1 receives the mobile-type service, the service vehicle 12 needs to stop in the vicinity of the user vehicle V1. Therefore, the user U1 should avoid parking the user vehicle V1 in a small parking space such that the service vehicle 12 cannot stop in the vicinity of the user vehicle V1. According to the present embodiment, the user U1 can know, with reference to the location data displayed on the display, where the other users have parked the respective user vehicles when the other users have used the mobile-type service. Thus, it becomes easier for the user U1 to know where to park the user vehicle V1 to receive the mobile-type service.

Figure 2:
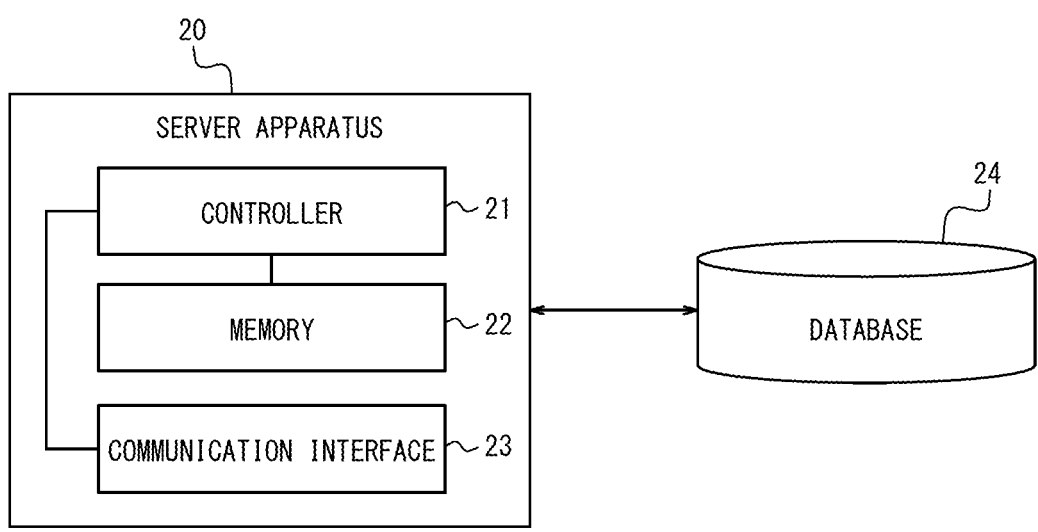
FIG. 2 is a block diagram illustrating a configuration of a server apparatus according to the embodiment of the present disclosure.

A configuration of the server apparatus 20 according to the present embodiment will be described with reference to FIG. 2.

The server apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the server apparatus 20 while controlling components of the server apparatus 20.

The memory 22 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 22 functions as, for example, a main memory, an auxiliary memory, or a cache memory. The memory 22 stores data to be used for operations of the server apparatus 20 and data obtained by the operations of the server apparatus 20.

The communication interface 23 includes at least one interface for communication. The interface for communication is, for example, an interface compatible with a wired LAN communication standard such as Ethernet® (Ethernet is a registered trademark in Japan, other countries, or both) or a wireless LAN communication standard such as IEEE802.11. The name "IEEE" is an abbreviation of Institute of Electrical and Electronics Engineers. The communication interface 23 communicates with the terminal apparatus 30. The communication interface 23 may communicate with the mobile device held by the service staff 11. The communication interface 23 may communicate with the in-vehicle device installed in the service vehicle 12 or the mobile device held by the staff on board the service vehicle 12. The communication interface 23 receives data to be used for the operations of the server apparatus 20, and transmits data obtained by the operations of the server apparatus 20.

The functions of the server apparatus 20 are realized by execution of a server program according to the present embodiment by a processor serving as the controller 21. That is, the functions of the server apparatus 20 are realized by software. The server program causes a computer to execute the operations of the server apparatus 20, thereby causing the computer to function as the server apparatus 20. That is, the computer executes the operations of the server apparatus 20 in accordance with the server program to thereby function as the server apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the server apparatus 20 may be realized by a programmable circuit or a dedicated circuit serving as the controller 21. That is, some or all of the functions of the server apparatus 20 may be realized by hardware.

The controller 21 accumulates the location data in a database 24. The database 24 may be built in the memory 22 or in an external storage to which the communication interface 23 can be connected.

In the present embodiment, the location data includes first location data and second location data. The first location data is data indicating, as first locations, the locations in which the respective user vehicles have been parked when the supply service has been used by the multiple users. The second location data is data indicating a second location when the supply service has become unavailable for use by at least one user due to a user vehicle of the at least one user having been parked in the second location. As a variation of the present embodiment, the second location data may be omitted.

In the present embodiment, the location data further includes first condition data and second condition data. The first condition data is data indicating environmental conditions at the first locations when the supply service has been used by the multiple users. The second condition data is data indicating an environmental condition at the second location when the supply service has been unavailable for use by the at least one user. The environmental conditions include, for example, weather or temperature. When the second location data is omitted, the second condition data is also omitted. As a variation of the present embodiment, the first condition data may be further omitted.

In the present embodiment, the location data further includes first evaluation data and second evaluation data. The first evaluation data is data indicating user evaluations on the first locations when the supply service has been used by the multiple users. The second evaluation data is data indicating a user evaluation on the second location when the supply service has been unavailable for use by the at least one user. The user evaluations include, for example, usability such as the sizes of the locations, whether the locations are windswept, or whether the locations have roofs. When the second location data is omitted, the second evaluation data is also omitted. As a variation of the present embodiment, the first evaluation data may be further omitted.

An example of the location data is illustrated in FIG. 3. In this example, a single table is used for illustrative purposes, but normalization may be performed in actual operation.

In the example illustrated in FIG. 3, the first location data and the second location data are stored in the database 24 as a combination of a location column 51, a coordinate column 52, a user column 53, a service flag column 54, and a date/time column 55. In the case of the first location data, the value of the service flag column 54 is "YES", which indicates that the supply service has been available. In the case of the second location data, the value of the service flag column 54 is "NO", which indicates that the supply service has been unavailable. When the second location data is omitted, the service flag column 54 may be omitted.

For example, in one record, the value of the location column 51 is "P2", the value of the user column 53 is "U2", and the value of the service flag column 54 is "YES". This record indicates that a user U2 has parked a vehicle in a location P2 and has used the supply service at a date and time represented by the value of the date/time column 55. The value of the coordinate column 52 is the coordinate value of the location P2. In another record, the value of the location column 51 is "P5", the value of the user column 53 is "U5", and the value of the service flag column 54 is "NO". This record indicates that a user U5 has parked a vehicle in a location P5, and that the user U5 has not been able to use the supply service because of the location P5 at a date and time represented by the value of the date/time column 55. The value of the coordinate column 52 is the coordinate value of the location P5.

In the example illustrated in FIG. 3, the first condition data and the second condition data are stored in the database 24 as a combination of the location column 51, the service flag column 54, the date/time column 55, and an environmental condition column 56. In the case of the first condition data, the value of the service flag column 54 is "YES", which indicates that the supply service has been available. In the case of the second condition data, the value of the service flag column 54 is "NO", which indicates that the supply service has been unavailable.

For example, in one record, the value of the location column 51 is "P2" and the value of the environmental condition column 56 is "sunny". This record indicates that the weather at the location P2 at the date and time represented by the value of the date/time column 55 has been sunny. In another record, the value of the location column 51 is "P5" and the value of the environmental condition column 56 is "rainy". This record indicates that the weather at the location P5 at the date and time represented by the value of the date/time column 55 has been rainy.

In the example illustrated in FIG. 3, the first evaluation data and the second evaluation data are stored in the database 24 as a combination of the location column 51, the user column 53, the service flag column 54, the date/time column 55, and a user evaluation column 57. In the case of the first evaluation data, the value of the service flag column 54 is "YES", which indicates that the supply service has been available. In the case of the second evaluation data, the value of the service flag column 54 is "NO", which indicates that the supply service has been unavailable.

For example, in one record, the value of the location column 51 is "P2", the value of the user column 53 is "U2", and the value of the service flag column 54 is "YES". This record indicates that, as a result of the user U2 having parked the vehicle in the location P2 and having used the supply service at the date and time represented by the value of the data/time column 55, the user U2 has given, on the location P2, an evaluation represented by the value of the user evaluation column 57. In another record, the value of the location column 51 is "P5", the value of the user column 53 is "U5", and the value of the service flag column 54 is "NO". This record indicates that, as a result of the user U5 having parked the vehicle in the location P5 and having been unable to use the supply service because of the location P5 at the date and time represented by the value of the data/time column 55, the user U5 has given, on the location P5, an evaluation represented by the value of the user evaluation column 57.

Figure 4:
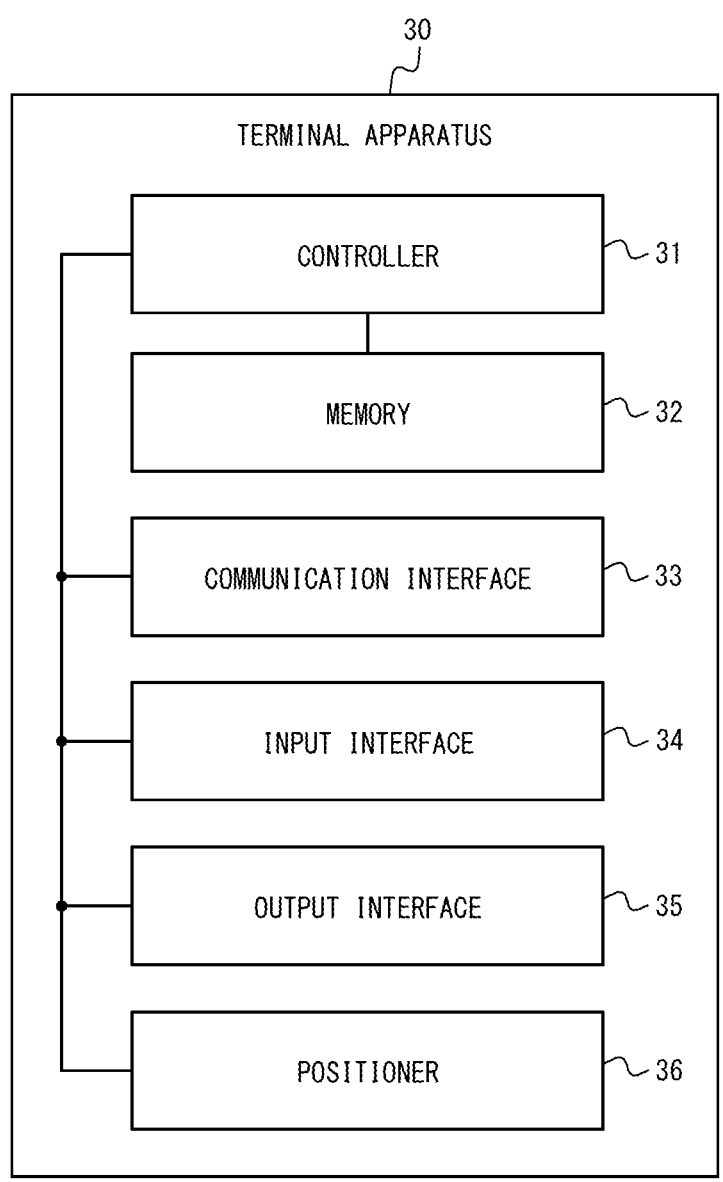
FIG. 4 is a block diagram illustrating a configuration of a terminal apparatus according to the embodiment of the present disclosure.

A configuration of the terminal apparatus 30 according to the present embodiment will be described with reference to FIG. 4.

The terminal apparatus 30 includes a controller 31, a memory 32, a communication interface 33, an input interface 34, an output interface 35, and a positioner 36.

The controller 31 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 31 executes processes related to operations of the terminal apparatus 30 while controlling components of the terminal apparatus 30.

The memory 32 includes at least one semiconductor memory, at least one magnetic memory, at least one optical memory, or any combination thereof. The semiconductor memory is, for example, RAM, ROM, or flash memory. The RAM is, for example, SRAM or DRAM. The ROM is, for example, EEPROM. The flash memory is, for example, SSD. The magnetic memory is, for example, HDD. The memory 32 functions as, for example, a main memory, an auxiliary memory, or a cache memory. The memory 32 stores data to be used for the operations of the terminal apparatus 30 and data obtained by the operations of the terminal apparatus 30.

The communication interface 33 includes at least one interface for communication. The interface for communication is, for example, an interface compatible with a mobile communication standard such as LTE, the 4G standard, or the 5G standard, a wireless LAN communication standard such as IEEE802.11. The term "LTE" is an abbreviation of Long Term Evolution. The term "4G" is an abbreviation of 4th generation. The term "5G" is an abbreviation of 5th generation. The communication interface 33 communicates with the server apparatus 20. The communication interface 33 receives data to be used for the operations of the terminal apparatus 30, and transmits data obtained by the operations of the terminal apparatus 30.

The input interface 34 includes at least one interface for input. The interface for input is, for example, a physical key, a capacitive key, a pointing device, a touch screen integrally provided with a display, a visible light camera, a LiDAR sensor, or a microphone. The term "LiDAR" is an abbreviation of light detection and ranging. The input interface 34 accepts an operation for inputting data to be used for the operations of the terminal apparatus 30. The input interface 34, instead of being included in the terminal apparatus 30, may be connected to the terminal apparatus 30 as an external input device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 35 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescent. The output interface 35 outputs data obtained by the operations of the terminal apparatus 30. The output interface 35, instead of being included in the terminal apparatus 30, may be connected to the terminal apparatus 30 as an external output device. As an interface for connection, an interface compliant with a standard such as USB, HDMI®, or Bluetooth® can be used.

The positioner 36 includes at least one GNSS receiver. The term "GNSS" is an abbreviation of global navigation satellite system. GNSS is, for example, GPS, QZSS, BDS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "BDS" is an abbreviation of BeiDou Navigation Satellite System. The term "GLONASS" is an abbreviation of Global Navigation Satellite System. The positioner 36 measures the position of the terminal apparatus 30.

The functions of the terminal apparatus 30 are realized by execution of the terminal program according to the present embodiment by a processor serving as the controller 31. That is, the functions of the terminal apparatus 30 are realized by software. The terminal program causes a computer to execute the operations of the terminal apparatus 30, thereby causing the computer to function as the terminal apparatus 30. That is, the computer executes the operations of the terminal apparatus 30 in accordance with the terminal program to thereby function as the terminal apparatus 30.

Some or all of the functions of the terminal apparatus 30 may be realized by a programmable circuit or a dedicated circuit serving as the controller 31. That is, some or all of the functions of the terminal apparatus 30 may be realized by hardware.

Figure 5:
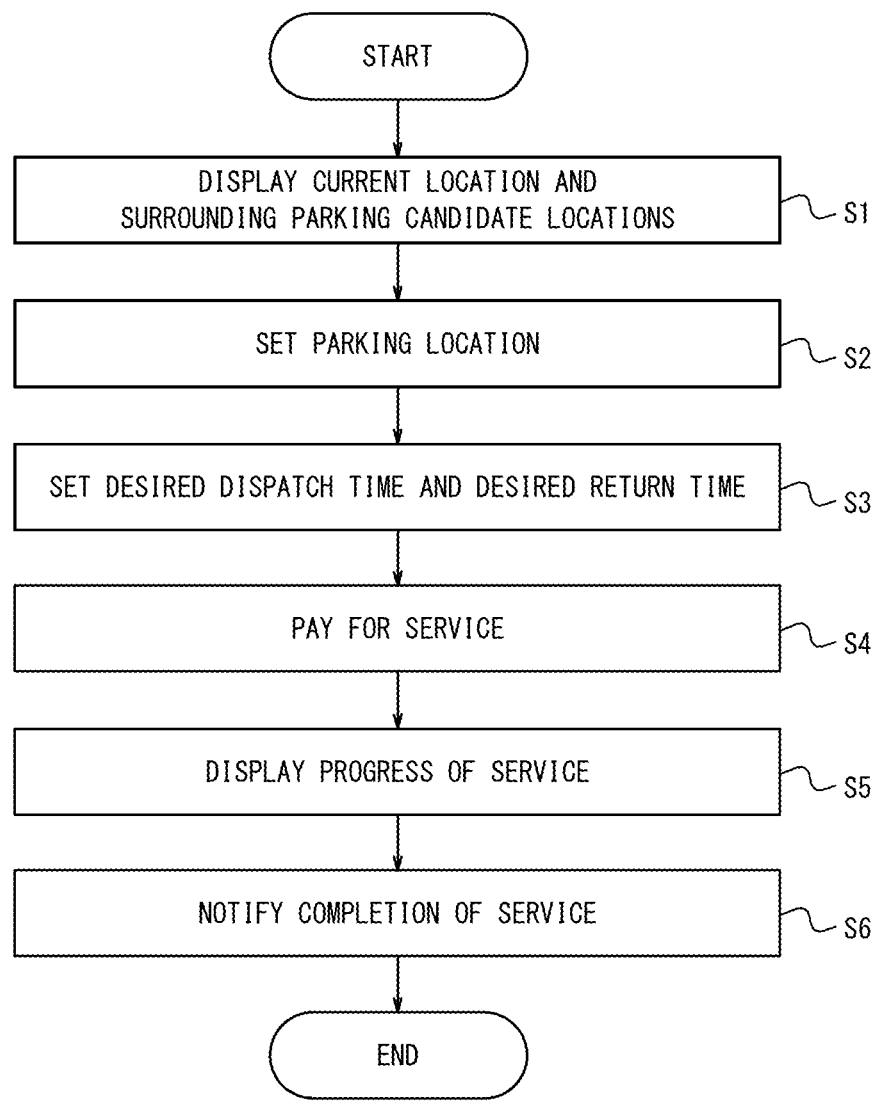
FIG. 5 is a flowchart illustrating operations of the system according to the embodiment of the present disclosure.

Operations of the system 10 according to the present embodiment will be described with reference to FIG. 5. The operations described below correspond to a service provision method according to the present embodiment.

When a user U1 starts the terminal program to request the supply service or selects a specific item such as "request service" on a menu screen of the terminal program, the process of step S1 is executed.

In step S1, the controller 31 of the terminal apparatus 30 transmits requirement data to the server apparatus 20 via the communication interface 33. The requirement data is data requiring information regarding locations in which respective user vehicles have been parked when the supply service has been used by multiple users. Upon receiving the requirement data from the terminal apparatus 30 via the communication interface 23, the controller 21 of the server apparatus 20 transmits location data accumulated in the database 24 to the terminal apparatus 30 via the communication interface 23. The location data is already explained. Upon receiving the location data from the server apparatus 20 via the communication interface 33, the controller 31 of the terminal apparatus 30 displays the received location data on a display as the output interface 35. Specifically, the controller 31 of the terminal apparatus 30 displays, on a map, locations indicated by the location data. The controller 31 of the terminal apparatus 30 also displays the current location of the terminal apparatus 30 on the map with reference to a positioning result obtained from the positioner 36. The current location of the terminal apparatus 30 corresponds to the current location of the user vehicle V1.

Figure 6:
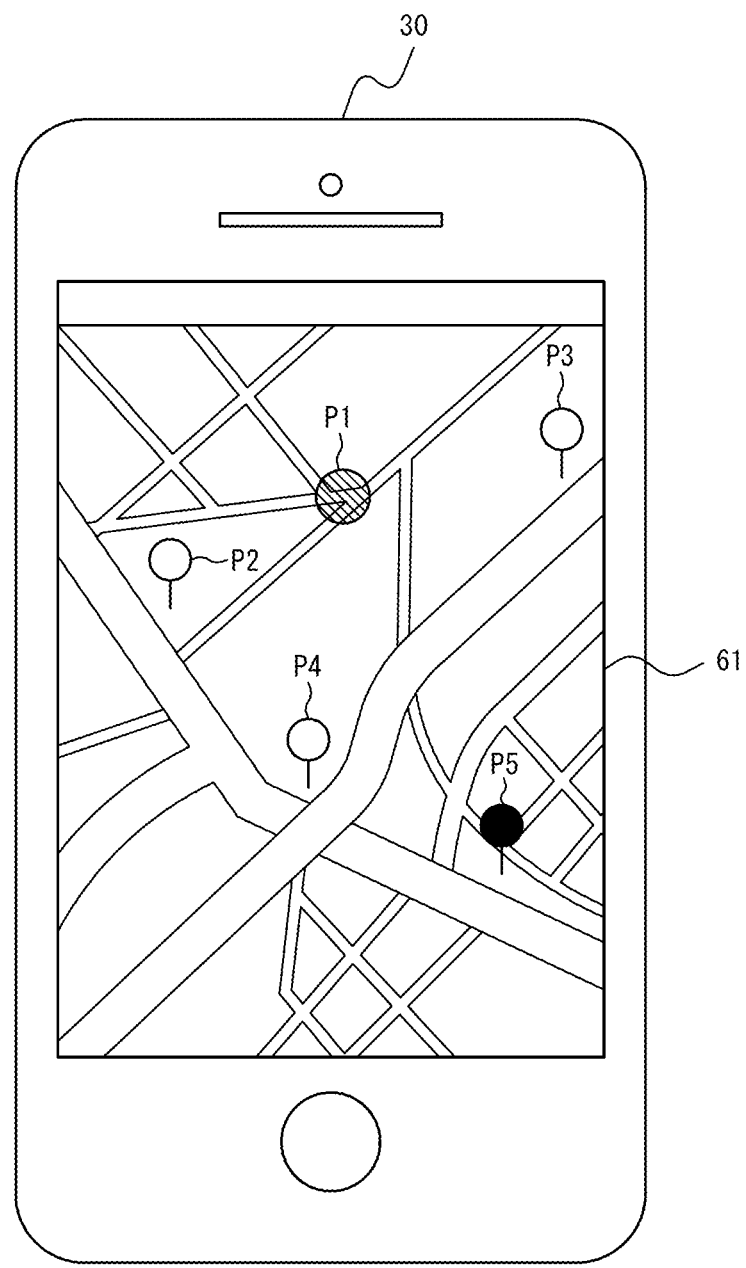
FIG. 6 is a diagram illustrating an example of a terminal screen corresponding to step S1 in FIG. 5.

As an example of a terminal screen corresponding to step S1, a first screen 61 is illustrated in FIG. 6. In the first screen 61, a location P1 is displayed on a map as the current location of the user vehicle V1. Respective locations P2 to P5 are displayed on the map as candidate parking locations in the vicinity of the user vehicle V1. Information regarding road congestion or parking lot congestion may also be displayed on the map.

In the present embodiment, upon detecting a parking lot dedicated to a specific user among the locations indicated by the location data, the controller 21 of the server apparatus 20 transmits the location data to the terminal apparatus 30 after excluding data indicating the detected parking lot. The location data may include data indicating, for example, which locations are public parking lots and which locations are private parking lots, so that parking lots dedicated to specific users can be detected.

In the present embodiment, the controller 31 of the terminal apparatus 30 displays, for each location indicated by the location data, the availability of the supply service. Specifically, the controller 31 of the terminal apparatus 30 identifies and displays, for each location indicated by the location data, the availability of the supply service with reference to first or second location data included in the location data. In the first screen 61, each of the locations P2 to P5 is color-coded according to the availability of the supply service. For example, each of the locations P2 to P4 is displayed in a color indicating that the supply service has been available, and the location P5 is displayed in a color indicating that the supply service has been unavailable.

The controller 31 of the terminal apparatus 30 may accept, via the input interface 34, a first user operation to set an environmental condition. The controller 31 of the terminal apparatus 30 may display, for each location indicated by the location data, the availability of the supply service according to the environmental condition set by the first user operation. Specifically, the controller 31 of the terminal apparatus 30 identifies and displays, for each location indicated by the location data, the availability of the supply service according to the environmental condition set by the first user operation with reference to the combination of the first or second location data and first or second condition data, which are included in the location data. For example, when weather such as sunny or rainy is set by the first user operation, each of the locations P2 to P5 may be color-coded on the first screen 61 according to the availability of the supply service when the weather has been the same as the set weather. When a range of temperature is set by the first user operation, each of the locations P2 to P5 may be color-coded on the first screen 61 according to the availability of the supply service when the temperature has been within the set range.

The controller 31 of the first terminal apparatus 30 may accept, via the input interface 34, a second user operation to input a destination. The controller 31 of the terminal apparatus 30 may select, according to the destination input by the second user operation, one location of the locations indicated by the first location data, as a recommended location. The controller 31 of the terminal apparatus 30 may display the selected recommended location in a distinguishable manner from the other locations indicated by the first location data. For example, on the first screen 61, a location closest to the input destination, among the locations P2 to P4, may be displayed in a different color than the other locations.

The controller 31 of the terminal apparatus 30 may display, for each location indicated by the location data, the presence or absence of a space for the service vehicle 12 to be dispatched in the mobile-type service. Specifically, the controller 31 of the terminal apparatus 30 may identify and display, for each location indicated by the location data, the presence or absence of the space for the service vehicle 12 with reference to first or second evaluation data included in the location data. Alternatively, the controller 31 of the terminal apparatus 30 may display, for each location indicated by the location data, the presence or absence of the space for the service vehicle 12, as determined by the server apparatus 20. In such a case, the controller 21 of the server apparatus 20 determines, for each location indicated by the location data, the presence or absence of the space for the service vehicle 12 with reference to a corresponding captured image. As the determination method, a known image processing method can be used. Machine learning, such as deep learning, may be used. The captured image corresponding to each location can be acquired, for example, by using an Internet service that provides panoramic photographs of scenery along roads around the world. The controller 21 of the server apparatus 20 notifies the terminal apparatus 30 of obtained determination results via the communication interface 23. For example, in the first screen 61, whether the space for the service vehicle 12 is present at each of the locations P2 to P5 may be displayed in text or a symbol. Each of the locations P2 to P5 may be color-coded according to the presence or absence of the space for the service vehicle 12. The presence or absence of the space for the service vehicle 12 is determined by considering, for example, the width, height, and length of the service vehicle 12. The presence or absence of the space for a mobile charging vehicle, as the service vehicle 12, may be determined by considering the position of a charging port of the user vehicle V1. The presence or absence of a space to park the user vehicle V1 may be further indicated. The presence or absence of the space to park the user vehicle V1 is determined, for example, by considering the size and minimum turning radius of the user vehicle V1.

The controller 31 of the terminal apparatus 30 may display, for each location indicated by the location data, the corresponding number of users. For example, in the first screen 61, how many users have parked vehicles and used the supply service in each of the locations P2 to P4 may be displayed in text. Each of the locations P2 to P4 may be color-coded according to the corresponding number of users.

The controller 31 of the terminal apparatus 30 may display, for each location indicated by the location data, the corresponding number of times the service has been used. For example, in the first screen 61, how many times users have parked vehicles and used the supply service in each of the locations P2 to P4 may be displayed in text. Each of the locations P2 to P4 may be color-coded according to the corresponding number of times the service has been used.

The controller 31 of the terminal apparatus 30 may display, for each location indicated by the location data, a corresponding user evaluation. Specifically, the controller 31 of the terminal apparatus 30 may display, for each location indicated by the location data, the user evaluation indicated by the first or second evaluation data included in the location data. For example, in the first screen 61, the user evaluation for each of the locations P2 to P5 may be displayed in text. Each of the locations P2 to P5 may be color-coded according to the corresponding user evaluation. For example, displaying the user evaluation that there is enough room for a mobile charging vehicle in the location P2 indicates that, if the user U1 parks the user vehicle V1 in the location P2, the user U1 can receive the mobile-type charging service. Displaying the user evaluation that there is no roof in the location P3 indicates that, if the user U1 parks the user vehicle V1 in the location P3 on a rainy day, the mobile-type service is difficult to receive.

In step S2, the controller 31 of the terminal apparatus 30 accepts, via the input interface 34, a third user operation to select one location, as a parking location, among the locations indicated by the location data received in step S1. In the third user operation, not only is the parking location selected, but also information regarding the details of the parking location may be input. The information to be input may include, for example, the name of a building when the parking location is in or adjacent to the building. The information to be input may include information on a parking lot, such as whether the parking lot is on the ground, on the basement, or with a roof, or a parking lot number. The information to be input may include, for example, a photograph of the area around the user vehicle V1 when the user U1 has already parked the user vehicle V1 in the parking location.

Figure 7:
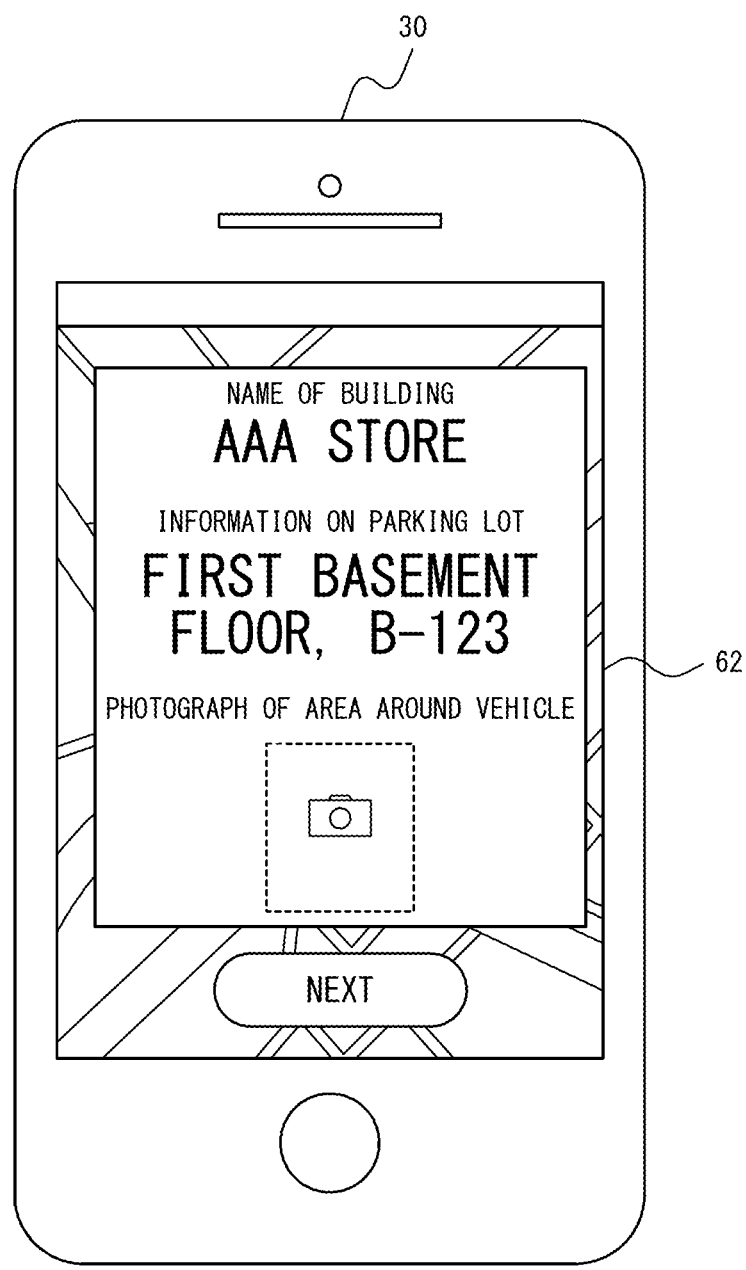
FIG. 7 is a diagram illustrating an example of a terminal screen corresponding to step S2 in FIG. 5.

As an example of a terminal screen corresponding to step S2, a second screen 62 is illustrated in FIG. 7. In the second screen 62, it is assumed that the location P3 is set as the parking location although the location P3 is hidden in an input form to input the information regarding the details of the parking location. As the information regarding the details of the parking location, the name of a building "AAA store", information on a parking lot "first basement floor", and a parking lot number "B-123" are input. The photograph of the area around the user vehicle V1 may be further input.

In step S3, the controller 31 of the terminal apparatus 30 accepts, via the input interface 34, a fourth user operation to input a desired dispatch time and a desired return time. The desired dispatch time corresponds to the time when the service staff 11 picks up the user vehicle V1, as desired by the user U1 in the case of the agent-type service. The desired dispatch time corresponds to the time when the service vehicle 12 arrives in the vicinity of the user vehicle V1, as desired by the user U1 in the case of the mobile-type service. The desired return time corresponds to the time when the service staff 11 returns the user vehicle V1 after charging or battery replacement, as desired by the user U1 in the case of the agent-type service. The desired return time corresponds to the time when the service vehicle 12 completes charging or battery replacement of the user vehicle V1, as desired by the user U1 in the case of the mobile-type service.

Figure 8:
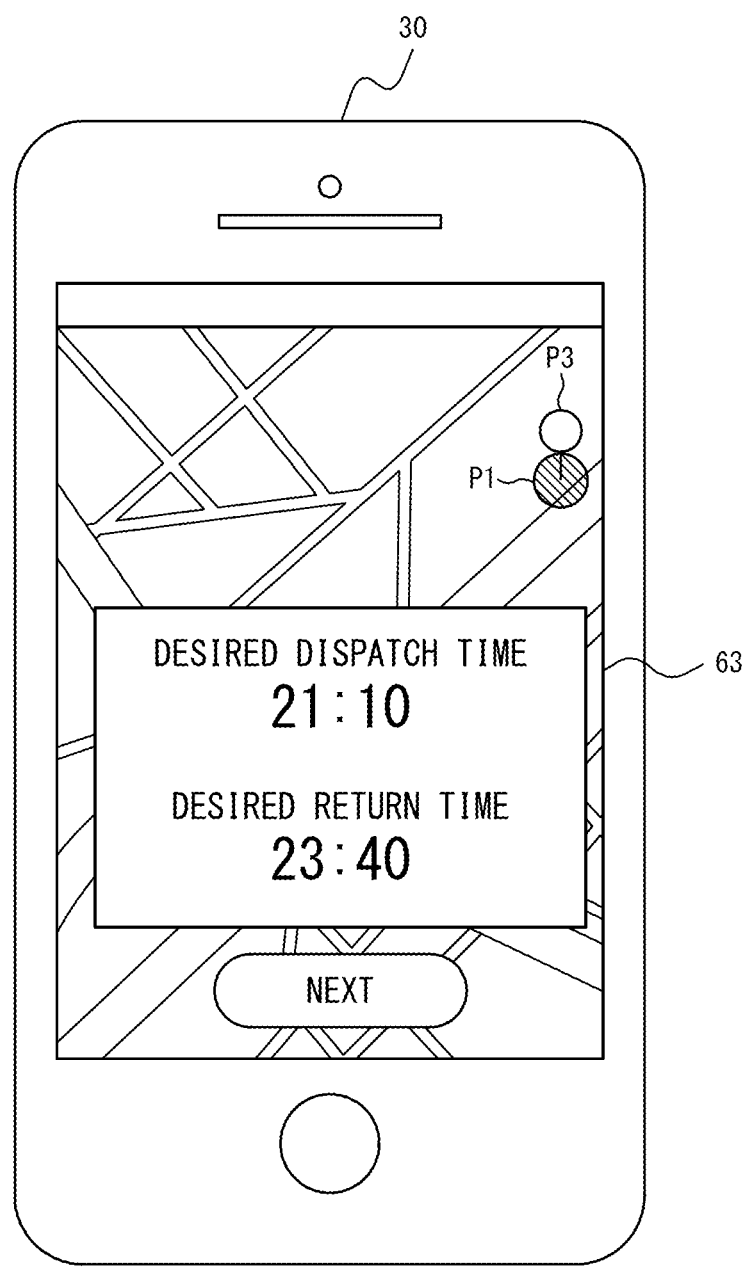
FIG. 8 is a diagram illustrating an example of a terminal screen corresponding to step S3 in FIG. 5.

As an example of a terminal screen corresponding to step S3, a third screen 63 is illustrated in FIG. 8. In the third screen 63, a desired dispatch time "21:10" and a desired return time "23:40" are set. Since the location P3 is set as the parking location in step S2, the other candidate parking locations, i.e., the locations P2, P4, and P5, are not displayed. Since the user U1 has already parked the user vehicle V1 in the location P3, the location P1 is displayed at the same position as the location P3 on the map.

In step S4, the controller 31 of the terminal apparatus 30 accepts, via the input interface 34, a fifth user operation to pay for the supply service. In the fifth user operation, a fee may be paid with a fixed payment method or a payment method may be selected. Payment method options include, for example, paying a package rate applied within a specific area, consuming a single use of the number of uses set in subscription, or paying a one-time fee. The controller 31 of the terminal apparatus 30 transmits the request data to the server apparatus 20 via the communication interface 33. The request data is data requesting the supply service with indication of the parking location that is selected by the third user operation in step S2. The request data may include the information regarding the details of the parking location, as input by the third user operation. In the present embodiment, the request data includes data indicating the desired dispatch time and the desired return time input by the fourth user operation in step S3. The request data may include data indicating a payment method selected by the fifth user operation. Upon receiving the request data from the terminal apparatus 30 via the communication interface 23, the controller 21 of the server apparatus 20 automatically processes payment for the supply service according to the received request data. Once the automatic process of payment is completed, the controller 21 of the server apparatus 20 performs a process of dispatching the service staff 11 or the service vehicle 12 to the parking location indicated by the request data. Specifically, the controller 21 of the server apparatus 20 notifies, of the request data, a manager who selects the type of the supply service according to the positional relationship between the service staff 11 or service vehicle 12 and the parking location and dispatches the service staff 11 or service vehicle 12 to the parking location. Alternatively, the controller 21 of the server apparatus 20 may automatically select the type of the supply service according to the positional relationship between the service staff 11 or service vehicle 12 and the parking location, and dispatch the service staff 11 or service vehicle 12 to the parking location. For example, when the distance or time required from the position of a worker, as the service staff 11, to the parking location is less than or equal to a threshold value, the controller 21 of the server apparatus 20 may transmit first instruction data via the communication interface 23 to a mobile device held by the worker. When the distance or time required from the position of a mobile charging vehicle, as the service vehicle 12, to the parking location is less than or equal to a threshold value, the controller 21 of the server apparatus 20 may transmit second instruction data via the communication interface 23 to an in-vehicle device installed in the mobile charging vehicle or a mobile device held by a worker on board the mobile charging vehicle. When the distance or time required from the position of a mobile battery replacement vehicle, as the service vehicle 12, to the parking location is less than or equal to a threshold value, the controller 21 of the server apparatus 20 transmits third instruction data via the communication interface 23 to an in-vehicle device installed in the mobile battery replacement vehicle or a mobile device held by a worker on board the mobile battery replacement vehicle. The first instruction data is data that instructs the worker to provide the agent-type charging service. Alternatively, the first instruction data may be data that instructs the worker to provide the agent-type battery replacement service. The second instruction data is data that instructs the mobile charging vehicle or the worker on board the mobile charging vehicle to provide the mobile-type charging service. The third instruction data is data that instructs the mobile battery replacement vehicle or the worker on board the mobile battery replacement vehicle to provide the mobile-type battery replacement service. The first, second, and third instruction data may include the information regarding the details of the parking location. The first, second, and third instruction data may include the data indicating the desired dispatch time and the desired return time.

Figure 9:
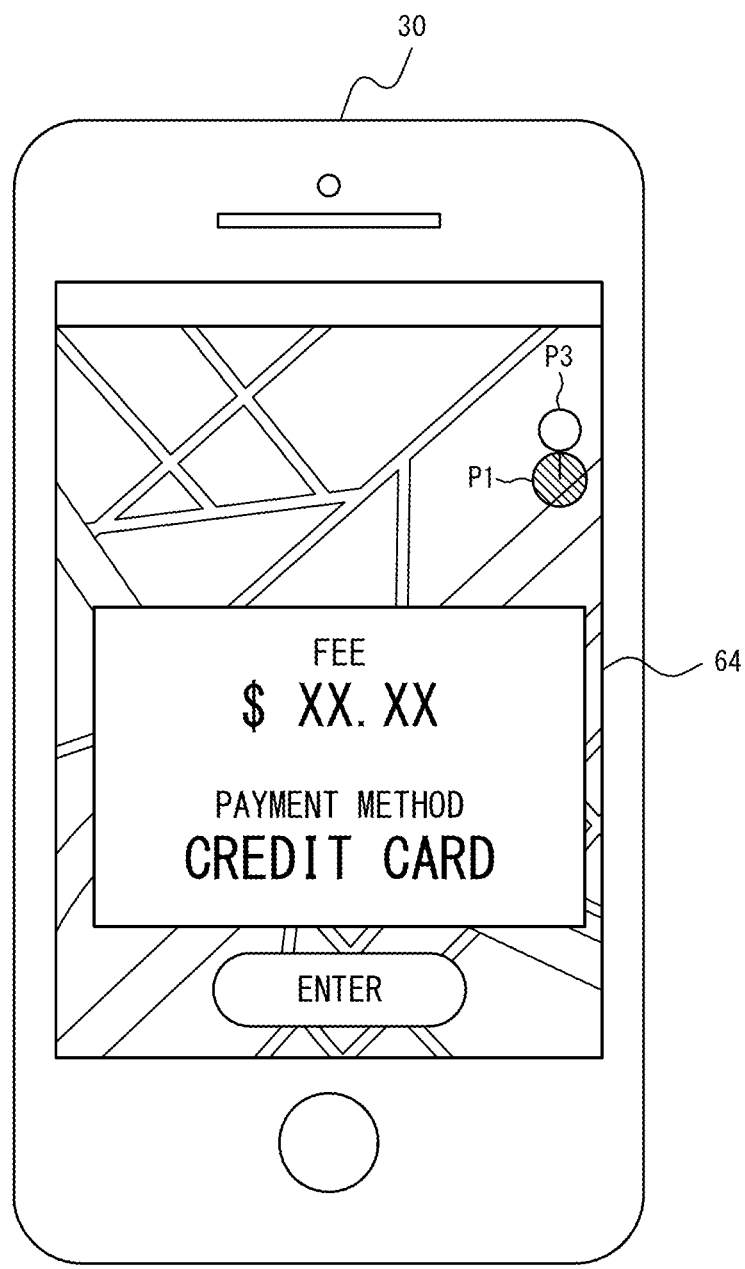
FIG. 9 is a diagram illustrating an example of a terminal screen corresponding to step S4 in FIG. 5.

As an example of a terminal screen corresponding to step S4, a fourth screen 64 is illustrated in FIG. 9. In the fourth screen 64, a fee for the supply service is displayed. A credit card is selected as a payment method.

In step S5, the controller 21 of the server apparatus 20 monitors the progress of the supply service. When the type of the supply service selected in step S4 is the agent-type charging service or the agent-type battery replacement service, the controller 21 of the server apparatus 20 monitors the progress by communicating via the communication interface 23 with the mobile device held by the worker. When the type of the supply service selected in step S4 is the mobile-type charging service, the controller 21 of the server apparatus 20 monitors the progress by communicating via the communication interface 23 with the in-vehicle device installed in the mobile charging vehicle or the mobile device held by the worker on board the mobile charging vehicle. When the type of the supply service selected in step S4 is the mobile-type battery replacement service, the controller 21 of the server apparatus 20 monitors the progress by communicating via the communication interface 23 with the in-vehicle device installed in the mobile battery replacement vehicle or the mobile device held by the worker on board the mobile battery replacement vehicle. The controller 21 of the server apparatus 20 notifies the terminal apparatus 30 of the progress via the communication interface 23. The controller 31 of the terminal apparatus 30 displays the progress to the display as the output interface 35.

Figure 10:
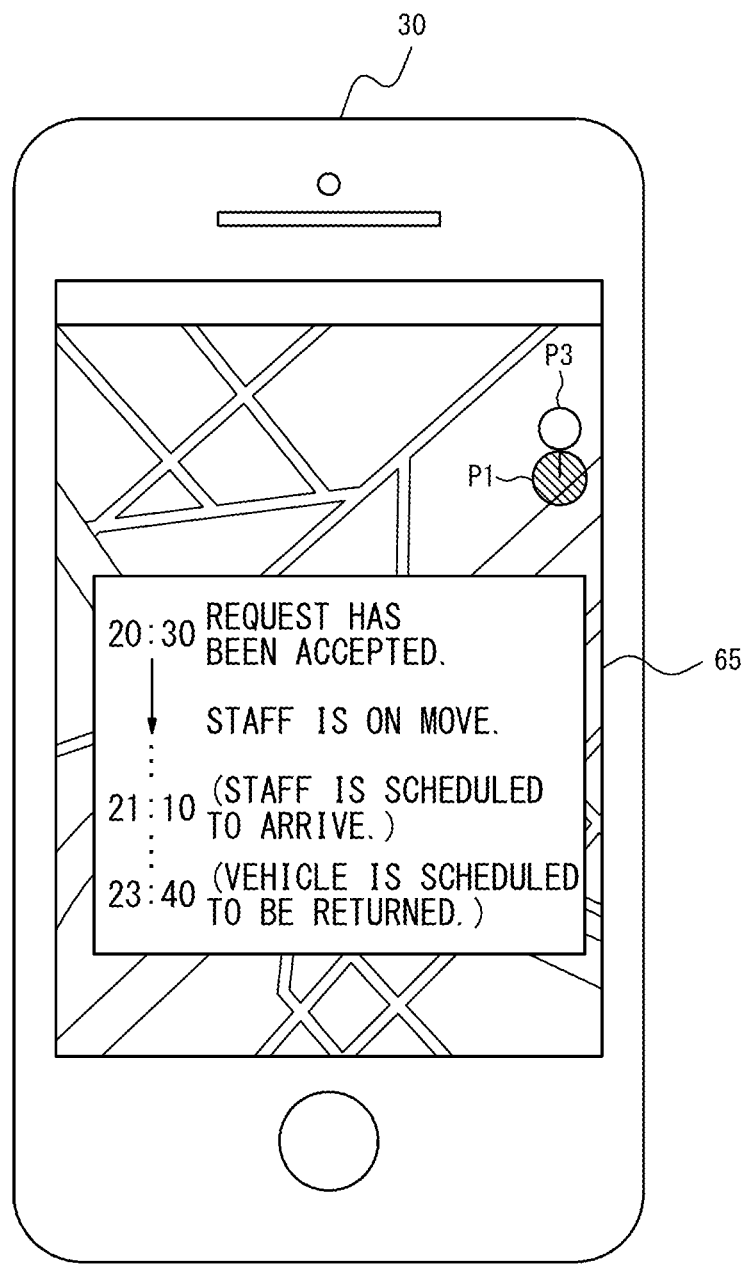
FIG. 10 is a diagram illustrating an example of a terminal screen corresponding to step S5 in FIG. 5.

As an example of a terminal screen corresponding to step S5, a fifth screen 65 is illustrated in FIG. 10. In the fifth screen 65, the time "20:30" when the supply service has been accepted and the current progress of the supply service "staff is on move" are displayed. The desired dispatch time "21:10" and the desired return time "23:40" are also displayed. The times are listed in ascending order. The position of the worker, the position of the mobile charging vehicle, or the position of the mobile battery replacement vehicle may be displayed on the map in real time. The user U1 may contact the worker who is heading for the parking location, using the terminal apparatus 30. When the type of the supply service selected in step S4 is the agent-type charging service, the position of the user vehicle V1 may be displayed on the map in real time after the user vehicle V1 is picked up, at least until the user vehicle V1 is moved to a charging station. When the type of the supply service selected in step S4 is the agent-type battery replacement service, the position of the user vehicle V1 may be displayed on the map in real time after the user vehicle V1 is picked up, at least until the user vehicle V1 is moved to a battery replacement station.

In step S6, upon detecting completion of the supply service, the controller 21 of the server apparatus 20 notifies the terminal apparatus 30 of the completion via the communication interface 23. The controller 31 of the terminal apparatus 30 displays a screen indicating that the supply service has been completed, on the display as the output interface 35. In this screen, when the type of the supply service selected in step S4 is the agent-type charging service or the agent-type battery replacement service, information regarding a position in which the worker has parked the user vehicle V1 may be displayed. A photograph of the user vehicle V1 taken by the worker may be displayed. The user U1 may be able to leave a review of the supply service using the terminal apparatus 30. The user U1 may be able to input a user evaluation on the parking location using the terminal apparatus 30. Data indicating the input user evaluation may be transmitted to the server apparatus 20 together with the data indicating the parking location, and registered in the database 24 as a new record of the location data. The user U1 may be able to input an environmental condition such as weather or temperature using the terminal apparatus 30. Data indicating the input environmental condition may be transmitted to the server apparatus 20 together with the data indicating the parking location, and registered in the database 24 as a new record of the location data.

As a variation of the present embodiment, the controller 21 of the server apparatus 20 may determine whether a remaining energy source of the user vehicle V1 is less than or equal to a threshold value. When the remaining energy source of the user vehicle V1 is determined to be less than or equal to the threshold value, the controller 21 of the server apparatus 20 may perform, before receiving the request data, a process of dispatching the service staff 11 or the service vehicle 12 to a pre-designated location. For example, when a remaining battery level of the battery B1 of the user vehicle V1 is less than or equal to a threshold value, the controller 21 of the server apparatus 20 may perform a process of dispatching the service staff 11 or the service vehicle 12 to a location pre-tied to the user U1, such as the home of the user U1. Such a process may be performed only when the user vehicle V1 is located in the vicinity of the location pre-tied to the user U1 or when the user vehicle V1 is heading for the location pre-tied to the user U1.

The present disclosure is not limited to the embodiment described above. For example, two or more blocks described in the block diagrams may be integrated, or a block may be divided. Instead of executing two or more steps described in the flowchart in chronological order in accordance with the description, the steps may be executed in parallel or in a different order according to the processing capability of the apparatus that executes each step, or as required. Other modifications can be made without departing from the spirit of the present disclosure.

Examples of some embodiments of the present disclosure are described below. However, it should be noted that the embodiments of the present disclosure are not limited to these examples.

[Appendix 1] A terminal program configured to request a service to dispatch a service staff or a service vehicle to a location in which a user vehicle is parked and supply an energy source to the user vehicle, the terminal program configured to cause a computer to execute operations, the operations comprising:
 receiving, from a server apparatus, location data indicating locations in which respective user vehicles have been parked when the service has been used by multiple users; and
 displaying the received location data on a display.

[Appendix 2] The terminal program according to appendix 1, wherein the displaying includes displaying, on a map, the locations indicated by the location data.

[Appendix 3] The terminal program according to appendix 1 or 2, wherein the service includes a charging service to supply the energy source to the user vehicle by charging a battery installed in the user vehicle, or a battery replacement service to supply the energy source to the user vehicle by replacing the battery installed in the user vehicle with another battery.

[Appendix 4] The terminal program according to any one of appendices 1 to 3, wherein the service includes an agent-type service to dispatch the service staff to the location in which the user vehicle is parked, have the dispatched service staff move the user vehicle to another location, and supply the energy source to the user vehicle at the location to which the user vehicle is moved.

[Appendix 5] The terminal program according to any one of appendices 1 to 4, wherein the service includes a mobile-type service to dispatch the service vehicle to the location in which the user vehicle is parked and have the dispatched service vehicle supply the energy source to the user vehicle in the location in which the user vehicle is parked.

[Appendix 6] The terminal program according to appendix 5, wherein the displaying includes displaying, for each location indicated by the location data, presence or absence of a space for the service vehicle to be dispatched.

[Appendix 7] The terminal program according to any one of appendices 1 to 6, wherein the displaying includes displaying, for each location indicated by the location data, a corresponding number of users.

[Appendix 8] The terminal program according to any one of appendices 1 to 7, wherein the displaying includes displaying, for each location indicated by the location data, a corresponding number of times the service has been used.

[Appendix 9] The terminal program according to any one of appendices 1 to 8, wherein the displaying includes displaying, for each location indicated by the location data, a corresponding user evaluation.

[Appendix 10] The terminal program according to any one of appendices 1 to 9, wherein
 the location data includes, in addition to first location data indicating, as first locations, the locations in which the respective user vehicles have been parked when the service has been used by the multiple users, second location data indicating a second location when the service has become unavailable for use by at least one user due to a user vehicle of the at least one user having been parked in the second location, and
 the displaying includes displaying, for each location indicated by the location data, availability of the service.

[Appendix 11] The terminal program according to appendix 10, wherein
 the operations further comprise accepting a user operation to set an environmental condition,
 the location data further includes first condition data indicating environmental conditions at the first locations when the service has been used by the multiple users, and second condition data indicating an environmental condition at the second location when the service has been unavailable for use by the at least one user, and
 the displaying includes displaying, for each location indicated by the location data, the availability of the service according to the environmental condition set by the user operation.

[Appendix 12] The terminal program according to any one of appendices 1 to 11, wherein
 the operations further comprise:
  accepting a user operation to input a destination; and selecting, according to the destination input by the user operation, one location of the locations indicated by the location data, as a recommended location, and the displaying includes displaying the selected recommended location in a distinguishable manner from other locations indicated by the location data.

[Appendix 13] The terminal program according to any one of appendices 1 to 12, wherein the operations further comprise:

accepting a user operation to select, as a parking location, one location of the locations indicated by the location data; and transmitting, to the server apparatus, request data requesting the service with indication of the parking location selected by the user operation.

[Appendix 14] A server apparatus comprising:

a communication interface configured to communicate with a terminal apparatus configured to request a service to dispatch a service staff or a service vehicle to a location in which a user vehicle is parked and supply an energy source to the user vehicle; and a controller configured to:
  accumulate location data indicating locations in which respective user vehicles have been parked when the service has been used by multiple users;
  transmit the accumulated location data to the terminal apparatus via the communication interface; and
  upon receiving, from the terminal apparatus via the communication interface, request data requesting the service with indication of a parking location designated using the terminal apparatus, perform a process of dispatching the service staff or the service vehicle to the parking location indicated by the received request data.

[Appendix 15] The server apparatus according to appendix 14, wherein the service includes a charging service to supply the energy source to the user vehicle by charging a battery installed in the user vehicle, or a battery replacement service to supply the energy source to the user vehicle by replacing the battery installed in the user vehicle with another battery.

[Appendix 16] The server apparatus according to appendix 14 or 15, wherein the service includes an agent-type service to dispatch the service staff to the location in which the user vehicle is parked, have the dispatched service staff move the user vehicle to another location, and supply the energy source to the user vehicle at the location to which the user vehicle is moved.

[Appendix 17] The server apparatus according to any one of appendices 14 to 16, wherein the service includes a mobile-type service to dispatch the service vehicle to the location in which the user vehicle is parked and have the dispatched service vehicle supply the energy source to the user vehicle in the location in which the user vehicle is parked.

[Appendix 18] The server apparatus according to any one of appendices 14 to 17, wherein the controller is configured to:

determine, for each location indicated by the location data, presence or absence of a space for the service vehicle to be dispatched, with reference to a corresponding captured image; and notify the terminal apparatus of obtained determination results via the communication interface.

[Appendix 19] The server apparatus according to any one of appendices 14 to 18, wherein the controller is configured to, upon determining that a remaining energy source in the user vehicle is less than or equal to a threshold value, perform, before receiving the request data, a process of dispatching the service staff or the service vehicle to a pre-designated location.

[Appendix 20] The server apparatus according to any one of appendices 14 to 19, wherein the controller is configured to, upon detecting a parking lot dedicated to a specific user among the locations indicated by the location data, transmit the location data to the terminal apparatus after excluding data indicating the detected parking lot.

The invention claimed is:

1. A non-transitory computer readable medium storing a terminal program configured to request a service to dispatch a service staff or a service vehicle to a location in which a user vehicle is parked and supply an energy source to the user vehicle, the terminal program configured to cause a computer to execute operations, the operations comprising:

receiving, from a server apparatus, location data indicating locations in which respective user vehicles have been parked when the service has been used by multiple users;

accepting a user operation to set an environmental condition; and displaying the received location data on a display, wherein
  the location data includes, in addition to first location data indicating, as first locations, the locations in which the respective user vehicles have been parked when the service has been used by the multiple users, second location data indicating a second location when the service has become unavailable for use by at least one user due to a user vehicle of the at least one user having been parked in the second location, first condition data indicating environmental conditions at the first locations when the service has been used by the multiple users, and second condition data indicating an environmental condition at the second location when the service has been unavailable for use by the at least one user, and wherein
  the displaying includes displaying, for each location indicated by the location data, availability of the service according to the environmental condition set by the user operation.

2. The non-transitory computer readable medium according to claim 1, wherein the displaying includes displaying, on a map, the locations indicated by the location data.

3. The non-transitory computer readable medium according to claim 1, wherein the service includes a charging service to supply the energy source to the user vehicle by charging a battery installed in the user vehicle, or a battery replacement service to supply the energy source to the user vehicle by replacing the battery installed in the user vehicle with another battery.

4. The non-transitory computer readable medium according to claim 1, wherein the service includes an agent-type service to dispatch the service staff to the location in which the user vehicle is parked, have the dispatched service staff move the user vehicle to another location, and supply the energy source to the user vehicle at the location to which the user vehicle is moved.

5. The non-transitory computer readable medium according to claim 1, wherein the service includes a mobile-type service to dispatch the service vehicle to the location in which the user vehicle is parked and have the dispatched service vehicle supply the energy source to the user vehicle in the location in which the user vehicle is parked.

6. The non-transitory computer readable medium according to claim 5, wherein the displaying includes displaying, for each location indicated by the location data, presence or absence of a space for the service vehicle to be dispatched.

7. The non-transitory computer readable medium according to claim 1, wherein the displaying includes displaying, for each location indicated by the location data, a corresponding number of users.

8. The non-transitory computer readable medium according to claim 1, wherein the displaying includes displaying, for each location indicated by the location data, a corresponding number of times the service has been used.

9. The non-transitory computer readable medium according to claim 1, wherein the displaying includes displaying, for each location indicated by the location data, a corresponding user evaluation.

10. The non-transitory computer readable medium according to claim 1, wherein
the operations further comprise:
accepting a user operation to input a destination; and
selecting, according to the destination input by the user operation, one location of the locations indicated by the location data, as a recommended location, and
the displaying includes displaying the selected recommended location in a distinguishable manner from other locations indicated by the location data.

11. The non-transitory computer readable medium according to claim 1, wherein the operations further comprise:
accepting a user operation to select, as a parking location, one location of the locations indicated by the location data; and
transmitting, to the server apparatus, request data requesting the service with indication of the parking location selected by the user operation.

12. A server apparatus comprising:
a communication interface configured to communicate with a terminal apparatus configured to request a service to dispatch a service staff or a service vehicle to a location in which a user vehicle is parked and supply an energy source to the user vehicle; and
a controller configured to:
accumulate location data indicating locations in which respective user vehicles have been parked when the service has been used by multiple users;
transmit the accumulated location data to the terminal apparatus via the communication interface; and
upon receiving, from the terminal apparatus via the communication interface, request data requesting the service with indication of a parking location designated using the terminal apparatus, perform a process of dispatching the service staff or the service vehicle to the parking location indicated by the received request data, wherein
the terminal apparatus is configured to:
accept a user operation to set an environmental condition; and
display the location data on a display, wherein
the location data includes, in addition to first location data indicating, as first locations, the locations in which the respective user vehicles have been parked when the service has been used by the multiple users, second location data indicating a second location when the service has become unavailable for use by at least one user due to a user vehicle of the at least one user having been parked in the second location, first condition data indicating environmental conditions at the first locations when the service has been used by the multiple users, and second condition data indicating an environmental condition at the second location when the service has been unavailable for use by the at least one user, and wherein
the terminal apparatus is configured to display, for each location indicated by the location data, availability of the service according to the environmental condition set by the user operation.

13. The server apparatus according to claim 12, wherein the service includes a charging service to supply the energy source to the user vehicle by charging a battery installed in the user vehicle, or a battery replacement service to supply the energy source to the user vehicle by replacing the battery installed in the user vehicle with another battery.

14. The server apparatus according to claim 12, wherein the service includes an agent-type service to dispatch the service staff to the location in which the user vehicle is parked, have the dispatched service staff move the user vehicle to another location, and supply the energy source to the user vehicle at the location to which the user vehicle is moved.

15. The server apparatus according to claim 12, wherein the service includes a mobile-type service to dispatch the service vehicle to the location in which the user vehicle is parked and have the dispatched service vehicle supply the energy source to the user vehicle in the location in which the user vehicle is parked.

16. The server apparatus according to claim 12, wherein the controller is configured to:
determine, for each location indicated by the location data, presence or absence of a space for the service vehicle to be dispatched, with reference to a corresponding captured image; and
notify the terminal apparatus of obtained determination results via the communication interface.

17. The server apparatus according to claim 12, wherein the controller is configured to, upon determining that a remaining energy source in the user vehicle is less than or equal to a threshold value, perform, before receiving the request data, a process of dispatching the service staff or the service vehicle to a pre-designated location.

18. The server apparatus according to claim 12, wherein the controller is configured to, upon detecting a parking lot dedicated to a specific user among the locations indicated by the location data, transmit the location data to the terminal apparatus after excluding data indicating the detected parking lot.

* * * * *